United States Patent [19]

Ali et al.

[11] Patent Number: 5,284,613
[45] Date of Patent: Feb. 8, 1994

[54] PRODUCING BLOWN FILM AND BLENDS FROM BIMODAL HIGH DENSITY HIGH MOLECULAR WEIGHT FILM RESIN USING MAGNESIUM OXIDE-SUPPORTED ZIEGLER CATALYST

[75] Inventors: Ahmed H. Ali, Somerset; John T. T. Hsieh, Warren, both of N.J.; Keith J. Kauffman, Houston, Tex.; Yury V. Kissin, East Brunswick; S. Christine Ong, Warren, both of N.J.; Giyarpuram N. Prasad, Melbourne, Australia; Ann L. Pruden, Bellemead; Sandra D. Schregenberger, Bridgewater, both of N.J.

[73] Assignee: Mobil Oil Corporation, Fairfax, Va.

[21] Appl. No.: 941,344

[22] Filed: Sep. 4, 1992

[51] Int. Cl.⁵ .............................................. B29C 55/28
[52] U.S. Cl. ................................. 264/566; 264/569; 264/210.6; 264/331.17; 264/349; 525/53; 525/240
[58] Field of Search .......................... 264/564–566, 264/569, 210.6, 331.15, 331.17, 347, 349; 525/53, 240

[56] References Cited

U.S. PATENT DOCUMENTS

| | | |
|---|---|---|
| 4,048,412 | 9/1977 | Caumartin et al. . |
| 4,336,352 | 6/1982 | Sakurai et al. . |
| 4,338,424 | 7/1982 | Morita et al. . |
| 4,390,669 | 6/1983 | Morita et al. ............................ 526/65 |
| 4,420,592 | 12/1983 | Kato et al. ............................... 526/65 |
| 4,461,873 | 7/1984 | Bailey et al. . |
| 4,481,301 | 11/1984 | Nowlin et al. . |
| 4,525,322 | 6/1985 | Page et al. . |
| 4,547,551 | 10/1985 | Bailey et al. . |
| 4,603,173 | 7/1986 | Mack et al. . |
| 4,606,879 | 8/1986 | Cerisano .............................. 264/569 |
| 4,626,397 | 12/1986 | Bose ..................................... 264/569 |
| 4,703,094 | 10/1987 | Raufast . |
| 4,792,588 | 12/1988 | Suga et al. ............................ 525/240 |
| 4,938,903 | 7/1990 | Schaeffer et al. ................... 264/569 |
| 4,954,391 | 9/1990 | Kotani et al. ........................ 264/564 |
| 4,975,485 | 12/1990 | Sato et al. ............................. 525/53 |
| 5,047,468 | 9/1991 | Lee et al. . |
| 5,082,902 | 1/1992 | Gurevitch et al. ............. 264/331.17 |

FOREIGN PATENT DOCUMENTS

| | | |
|---|---|---|
| 369436 | 5/1990 | European Pat. Off. . |
| 0503791 | 9/1992 | European Pat. Off. . |
| 53-52570 | 5/1978 | Japan ................................... 264/564 |
| 59-179507 | 10/1984 | Japan . |
| 59-179508 | 10/1984 | Japan . |

Primary Examiner—Jeffery Thurlow
Attorney, Agent, or Firm—Alexander J. McKillop; Malcolm D. Keen; Marina V. Schneller

[57] ABSTRACT

A blend for blown film which exhibits improved MD/TD tear balance. The blend is a bimodal molecular weight ethylene resin containing two fractions of different molecular weight. The weight fraction of a higher molecular weight component of the blend is about 0.35 to 0.75.

14 Claims, 1 Drawing Sheet

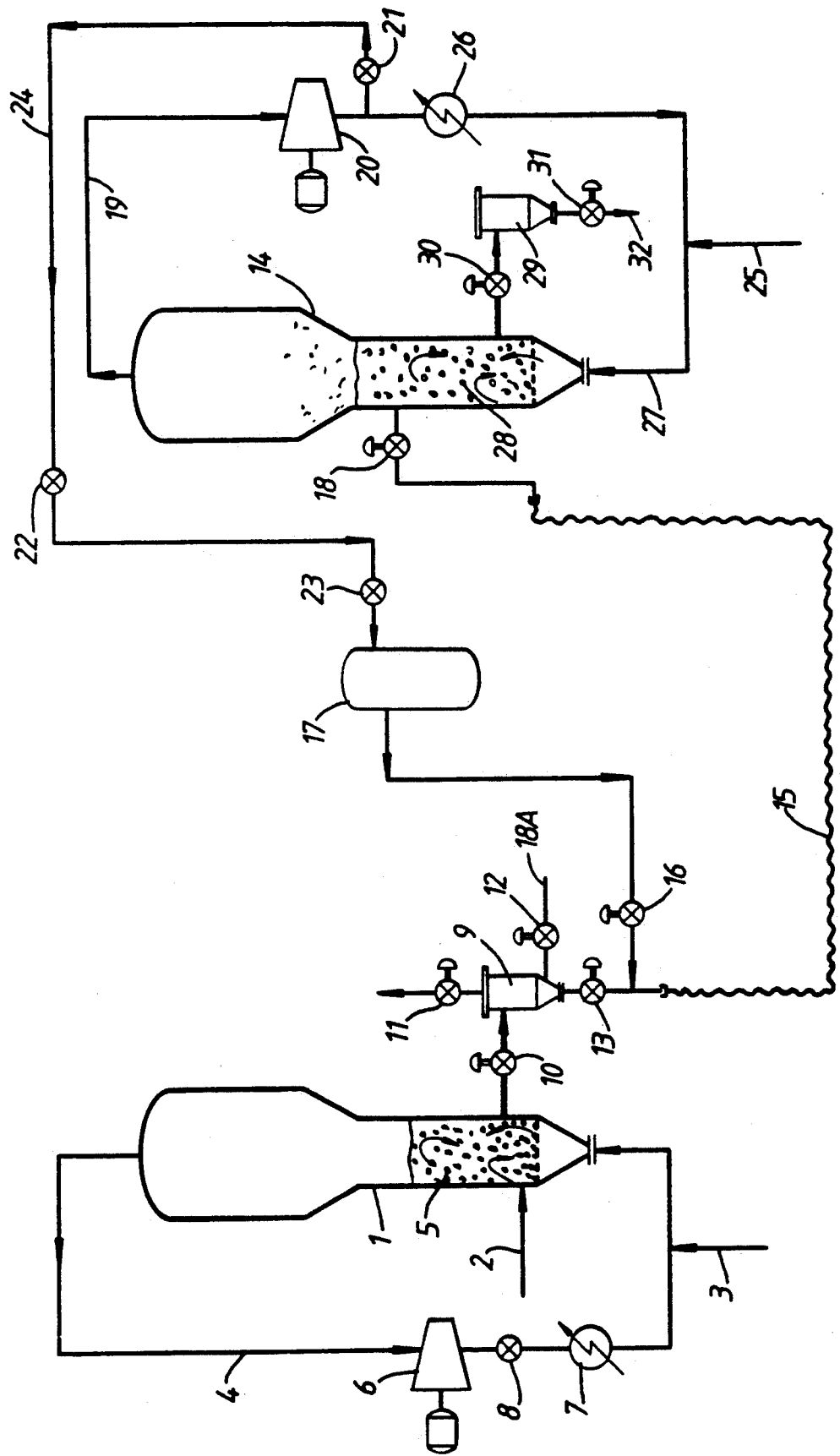

PRODUCING BLOWN FILM AND BLENDS FROM BIMODAL HIGH DENSITY HIGH MOLECULAR WEIGHT FILM RESIN USING MAGNESIUM OXIDE-SUPPORTED ZIEGLER CATALYST

FIELD OF THE INVENTION

This invention relates to the production of film grade polyethylene, processable in high stalk extrusion. The resins are high density polyethylene (HDPE) produced in a process which relies upon a particular catalyst. The high density polyethylene is a bimodal ethylene polymer composition comprising a mixture of relatively high and relatively lower molecular weight polymers blended together which exhibits optimal MD/TD balance.

Preferably, the resins are produced in a gas-phase, fluidized bed polymerization in a multi stage process wherein the blending occurs in situ.

BACKGROUND OF THE INVENTION

High density polyethylene (HDPE) is one of the most versatile of the thermoplastic resins and offers a broad spectrum of uses. The properties of finished goods made from HDPE are strongly influenced by the polymerization and processing conditions and the properties of the polymer and the resin.

Physical and mechanical properties of Ziegler HDPE can be summarized as follows: low to medium stiffness and hardness; medium to extremely high toughness; no reduction in toughness to $-40°$ C.; unrestricted usage in contact with food; no restriction for disposal, burning, or recycling; high resistance against solvents and chemicals at ambient temperature; and easy and safe to process.

Molecular weights of polyethylenes are customarily evaluated by measuring their melt indexes in accordance with ASTM D-1238. Three melt indexes are cited below, those measured with the weights of 21.6 kg ($I_{21}$ or high-load melt index, HLMI), 5.0 kg ($I_5$) and 2.16 kg ($I_2$ or melt index, MI). All these numbers vary inversely with resins' molecular weight.

Strength, as well as impact, stress and puncture resistance, together with toughness, are attributed to high molecular weight resins.

However, as the molecular weight of the resin increases, the processability of the resin usually does decrease. By providing a blend of polymers, the properties characteristic of high molecular weight resins can be retained and processability, particularly extrudability, can be improved.

Various approaches have been examined for production of such blends. Physical blending suffers the disadvantage brought on by the requirement of complete homogenization and attendant high cost. Direct synthesis with one catalyst, although theoretically possible and most desirable, is difficult to achieve. The third strategy is a multi-stage polymerization which involves different staging of variables, usually in multi reactor set ups, sometimes referred to as tandem, which provide the possibility of diversity in molecular weight. The products exhibit good ESCR and stiffness.

However, the tandem produced products have not received universal domestic market acceptance because the tandem produced products exhibit different swell and melt fracture characteristics from the Phillips type resins, requiring downstream equipment modification, with high attendant costs.

In accordance with the invention, it is an object to provide bimodal film with the desired physical properties of the tandem products but with improved bubble stability and film MD and TD tear properties.

SUMMARY OF THE INVENTION

The invention relates to blends exhibiting excellent bubble stability and a good balance in the MD and TD tear properties. The invention relates to blends which exhibit excellent bubble stability in high stalk extrusion. The invention relates to forming a bimodal MWD blend of a high HLMI ethylene resin containing catalyst particles and/or residues of said catalyst particles, with a low molecular weight ethylene polymer or copolymer. The high HLMI resin is formed in the presence of an MgO containing catalyst defined below, which produces a high molecular weight component with a high MFR, which is characteristic of broad molecular weight distribution. MFR is the ratio, HLMI/MI.

The bimodal MWD (molecular weight distribution) resin blends can be prepared by using a family of magnesium-oxide-supported Ziegler catalyst modified with aliphatic acid and high alkanol, as described in U.S. Pat. No. 4,863,886, which is relied upon and incorporated by reference herein. These catalysts are useful for preparing the relatively higher molecular weight component of the bimodal blend for ultimate application in high density high molecular weight film applications. These catalysts produce high molecular weight components of broad molecular weight distribution and higher activity under high $H_2/C_2$ ratios. The catalysts had the advantage of requiring higher hydrogen to ethylene ratios of about 0.067 in the first stage of the gas-phase tandem process to give 0.41 HLMI ($MI_{21}$) resin. The tolerance for the higher hydrogen/ethylene ratios can facilitate control of the HLMI of the first stage reactor product in tandem process in which the relatively higher molecular weight component is produced in a first gas phase in a first fluid bed reactor and then transferred to a second fluid bed reactor for production of the relatively lower molecular weight component to produce a bimodal blend.

Preferably, formation of the low molecular weight polymer or copolymer is by in situ polymerization of the low molecular weight component in the presence of the HLMI component containing an active MgO catalyst. The blending can be undertaken by a process including the steps of polymerizing gaseous monomeric compositions comprising a major proportion of ethylene in at least two gas phase, under the following conditions. In the first stage, a gas comprising monomeric composition and, optionally, a small amount of hydrogen, is contacted under polymerization conditions with the MgO containing catalyst comprising a transition metal compound component and a reducing agent (cocatalyst) such as an organometallic compound or metal hydride as cocatalyst, at a hydrogen/ethylene molar ratio of no higher than about 0.3 and an ethylene partial pressure no higher than about 100 psia such as to produce a relatively high molecular weight (HMW) polymer powder wherein the polymer is deposited on the catalyst particles. The HMW polymer powder containing the catalyst is then subjected to a second stage with, optionally, additional cocatalyst which may be the same or different from the cocatalyst utilized in the first stage, together with a gaseous mixture comprising hydrogen and monomeric composition wherein additional polymerization is carried out at a hydrogen/ethylene molar ratio of at least about 0.9, the ratio being sufficiently high such that it is at least about 8.0 times that in the first reactor, and an ethylene partial pressure at least 1.7 times that in the first reactor, to produce a relatively low molecular weight (LMW) polymer much of which is deposited on and within the HMW polymer/catalyst particles from the first, such that the fraction of HMW polymer in the bimodal polymer leaving the second reactor is at least about 0.35.

The foregoing conditions provide for a process wherein the production of fines (polymer particles) tending to foul compressors and other equipment is kept to a relatively low level. Moreover, such conditions provide for an inhibited level of productivity in the first reactor with a resulting increased level of productivity in the second reactor to produce a bimodal polymer blend having a favorable melt flow ratio (MFR, an indication of molecular weight distribution) and a high degree of homogeneity (indicated by low level of gels and low heterogeneity index) caused by a substantial degree of blending of HMW and LMW polymer in each final polymer particle inherently resulting from the process operation. The bimodal blend is capable of being processed without undue difficulty into films and containers for household industrial chemicals having a superior combination of mechanical properties.

DESCRIPTION OF THE DRAWING

The drawing is a schematic representation of a process of the invention.

DETAILED DESCRIPTION OF THE INVENTION

The gaseous monomer entering both reactors may consist wholly of ethylene or may comprise a preponderance of ethylene and a minor amount of a comonomer such as a 1-olefin containing 4 to about 10 carbon atoms. Comonomeric 1-olefins which may be employed are, for example, 1-butene, 1-pentene, 1-hexene, 4-methyl-1-pentene, 1-octene, 1-decene, and mixtures thereof. The comonomer may be present in the monomeric compositions entering either or both reactors.

In many cases, the monomer composition will not be the same in both reactors. For example, in making resin intended for high density film, it is preferred that the monomer entering the first reactor contain a minor amount of comonomer such as 1-hexene so that the HMW component of the bimodal product is a copolymer, whereas the monomer fed to the second reactor consists essentially of ethylene so that the LMW component of the product is substantially an ethylene homopolymer. When a comonomer is employed so as to obtain a desired copolymer in either or both reactors, the molar ratio of comonomer to ethylene may be in the range, for example, of about 0.005 to 0.7, preferably about 0.04 to 0.6.

Hydrogen may or may not be used to modulate the molecular weight of the HMW polymer made in the first reactor. Thus, hydrogen may be fed to the first reactor such that the molar ratio of hydrogen to ethylene ($H_2/C_2$ ratio) is, for example, up to about 0.3, preferably about 0.005 to 0.2. In the second reactor it is necessary to produce a LMW polymer with a low enough molecular weight and in sufficient quantity so as to produce a bimodal resin which can be formed, with a minimum of processing difficulties, into end use products such as containers for household industrial chemicals having a superior combination of mechanical properties. For this purpose, hydrogen is fed to the second reactor with the ethylene containing monomer such that the hydrogen to ethylene mole ratio in the gas phase is at least about 0.9, preferably in the range of about 0.9 to 5.0 and most preferably in the range of about 1.0 to 3.5. Moreover, to provide a sufficient difference between the molecular weights of the polymers in the first and second reactor so as to obtain a bimodal resin product having a wide enough molecular weight distribution necessary for the desired levels of processability and mechanical properties, the hydrogen to ethylene mole ratios in the two reactors should be such that the ratio in the second reactor is at least about 8.0 times the ratio in the first reactor, for example in the range 8.0 to 10,000 times such ratio, and preferably 10 to 200 times the ratio in the first reactor.

In accordance with the invention, a catalyst is employed which tolerates high hydrogen/ethylene ratios. Accordingly, the process of the invention, allowing higher hydrogen/ethylene ratios in the first reactor provides greater control of the first stage product HLMI.

Utilizing the hydrogen to ethylene ratios set out previously to obtain the desired molecular weights of the HMW and LMW polymers produced in the first and second stages (and/or reactors) respectively tends to result in relatively high polymer productivity in the first reactor and relatively low productivity in the second reactor. This tends to result in turn in a bimodal polymer product containing too little LMW polymer to maintain satisfactory processability. For this purpose, the ethylene partial pressure employed in the first stage is no higher than about 100 psia, for example in the range of about 15 to 100 psia, preferably in the range of about 20 to 80 psia and the ethylene partial pressure in the second stage is, for example in the range of about 26 to 170 psia, preferably about 70 to 120 psia, with the ethylene partial pressures in any specific process being such that the ratio of ethylene partial pressure in the second to that in the first stage is at least about 1.7, preferably about 1.7 to 7.0, and more preferably about 2.0 to 4.0.

If desired for any purpose, e g., to control superficial gas velocity or to absorb heat of reaction, an inert gas such as nitrogen may also be present in one or both reactors in addition to the monomer and hydrogen. Thus the total pressure in both stages may be in the range, for example, of about 100 to 600 psig, preferably about 200 to 350 psig.

The temperature of polymerization in the first stage may be in the range, for example, of about 60° to 130° C., preferably about 60° to 90°, while the temperature in the second stage may be in the range, for example, of about 80° to 130° C., preferably about 90° to 120° C. For the purpose of controlling molecular weight and productivity in both stages, it is preferred to increase the temperature in the second stage compared to the first stage temperature, preferably by at least about 10° C. higher, sometimes by about 30° to 60° C. higher than that in the first reactor.

The residence time of the catalyst in each stage is controlled so that the productivity is suppressed in the first stage reactor and enhanced in the second stage reactor, consistent with the desired properties of the bimodal polymer product. Thus, the residence time may be, for example, about 0.5 to 6 hours, preferably about 1 to 3 hours in the first reactor, and, for example, about 1 to 12 hours, preferably about 2.5 to 5 hours in the second reactor, with the ratio of residence time in the second reactor to that in the first reactor being in the range, for example, of about 5 to 0.7, preferably about 2 to 1.

The superficial gas velocity through both reactors is in a tandem series for conducting the process sufficiently high to disperse effectively the heat of reaction so as to prevent the temperature from rising to levels which could partially melt the polymer and shut the reactor down, and high enough to maintain the integrity of the fluidized beds. Such gas velocity is in the range, for example, of about 40 to 120, preferably about 50 to 90 cm/sec.

The productivity of the process in the first stage reactor in terms of grams of polymer per gram atom of transition metal in the catalyst multiplied by $10^6$, may be in the range, for example, of about 1.6 to 16.0, preferably about 3.2 to 9.6; in the second stage, the productivity may be in the range, for example, of about 0.6 to 9.6, preferably about 1.6 to 3.5, and in the overall process, the productivity is in the range, for example, of about 2.2 to 25.6, preferably about 4.8 to 16.0. The foregoing ranges are based on analysis of residual catalyst metals in the resin product.

The polymer produced in the first stage reactor has a flow index (HLMI, FI or $I_{21}$, measured at 190° C. in accordance with ASTM D-1238, Condition F), for example, of about 0.05 to 5, preferably about 0.1 to 3 grams/10 min. and a density in the range, for example, of about 0.890 to 0.960, preferably about 0.900 to 0.940 grams/cc.

The polymer produced in the second reactor has a melt index (MI or $I_2$, measured at 190° C. in accordance with ASTM D-1238, Condition E) in the range, for example, of about 10 to 4000, preferably about 15 to 2000 grams/10 min. and a density in the range, for example, of about 0.890 to 0.976, preferably about 0.930 to 0.976 grams/cc. These values are calculated based on a single reactor process model using steady state process data.

The final granular bimodal blend will exhibit balanced MD tear and TD tear values.

The final granular bimodal polymer from the second reactor has a weight fraction of HMW polymer of at least about 0.35, preferably in the range of about 0.35 to 0.75, more preferably about 0.45 to 0.65, a flow index in the range, for example, of about 3 to 200, preferably about 6 to 100 grams/10 min., a melt flow ratio (MFR, calculated as the ratio of flow index to melt index) in the range, for example, of about 60 to 250, preferably about 80 to 150, a density in the range, for example, of about 0.89 to 0.965, preferably about 0.910 to 0.960, an average particle size (APS) in the range, for example, of about 127 to 1270, preferably about 380 to 1100 microns, and a fines content (defined as particles which pass through a 120 mesh screen) of less than about 10 weight percent, preferably less than about 3 weight percent. With regard to fines content, it has been found that a very low amount of fines are produced in the first (HMW) reactor and that the percentage of fines changes very little across the second reactor. This is surprising since a relatively large amount of fines are produced when the first or only reactor in a gas phase, fluidized bed system is used to produce a relatively low molecular weight (LMW) polymer as defined herein. A probable explanation for this is that in the process of this invention, the LMW polymer formed in the second reactor deposits primarily within the void structure of the HMW polymer particles produced in the first reactor, minimizing the formation of LMW fines. This is indicated by an increase in settled bulk density (SBD) across the second reactor while the APS stays fairly constant.

When pellets are formed from granular resin which was stabilized and compounded with two passes on a Brabender extruder to ensure uniform blending, such pellets have a flow index in the range, for example, of about 3 to 200, preferably about 6 to 100 grams/10 min., a melt flow ratio in the range, for example, of about 60 to 250, preferably about 80 to 150, and a heterogeneity index (HI, the ratio of the FI's of the granular to the pelleted resin) in the range for example of about 1.0 to 1.5, preferably about 1.0 to 1.3. HI indicates the relative degree of inter-particle heterogeneity of the granular resin.

The catalysts used herein are MgO catalysts treated to contain transition metal so that the amount of transition metal ranges from 0.5 to 20, preferably 1.0 to 1.6 mmole/gram of catalyst. Preferably, the transition metal is titanium. In contrast, silica supported Mg and titanium produce products with a FR of about 9.5 to 10.5 at the same flow index range, which is too narrow to give acceptable products. These MgO catalysts are activated with activators, or cocatalysts comprising trialkylaluminum, dialkylaluminum hydrides and dialkylaluminum halides, in each of which the alkyl contains 1 to 12 carbon atoms and can be selected from the group consisting of methyl, ethyl propyl, isopropyl, butyl, isobutyl, t-butyl, pentyl, iso-pentyl (the isoamyl isomers), the hexyl and hexyl isomers, and admixtures thereof. The activity of the catalyst may be enhanced by using as a cocatalyst diisobutylaluminum hydride (DIBAH) or triisobutylaluminum (TIBA) and by feeding isopentane into the first reactor with the catalyst. The amount of activator, (cocatalyst) ranges from 0.5 to 2.0, preferably 1.0 to 1.6, preferably about 1 millimole/gram catalyst.

The general preparation of these catalysts involves treating MgO support with an organic acid, reacting the treated support with Ti tetrahalide (e.g. $TiCl_4$) and pre-reducing the catalyst with an aluminum alkyl. Suitable in carrying out the process of this invention are catalysts prepared by pre-treating a dried magnesium oxide (MgO) support with an organic acid, e.g. 2-ethoxybenzoic acid, and contacting the resulting pre-treated support material with a titanium compound which is the reaction product of titanium tetrachloride and an alkanol having 5 to 12 carbon atoms. The initial treatment of the MgO support with organic acid is conducted with a molar excess of MgO. Preferably, the ratio of organic acid to MgO is from 0.001 to 0.5 most preferably from 0.005 to 0.1. After drying, the acid-treated MgO support is again treated in a similar mannner with the product of an alkanol or polyhydroxy alkanol having 5 to 12 carbon atoms in a ratio of about 0.5 to 1.5, preferably about 0.8 to 1.2, moles of the alkanol per mole of $TiCl_4$. The material is then treated with a hydrocarbylaluminum, e.g., tri-n-hexylaluminum to obtain the supported catalyst, which may be utilized with additional amounts of a hydrocarbyl aluminum cocatalyst, e.g., di-n-hexylaluminum hydride, (DIBAH), as described previously in connection with the process of this invention. The catalysts are described more fully in U.S. Pat. No. 4,863,886, the entire disclosure of which is incorporated herein by reference.

Another group of catalysts suitable for the process of this invention are those prepared by treating a magnesium oxide (MgO) support with an organic acid, e.g., 2-ethoxybenzoic acid, acetic acid, or octanoic acid (caprylic acid), reacting the treated support with titanium tetrachloride, and pre-reducing the catalyst with an aluminum alkyl, e.g., triethylaluminum, tri-n-hexylaluminum, diisobutylaluminum hydride, or trimethylaluminum; the amount of this reagent can range from 0.25 to 1 millimole/gram catalyst. During polymerization, a cocatalyst is used which may also be an aluminum alkyl such as any of those in the foregoing list of pre-reducing agents or cocatalysts. Use of these catalysts produces a high molecular weight component with broad molecular weight distribution and produces a resin which exhibits excellent bubble stability in high stalk extrusion to produce blown film. Because of the high activity of the catalyst, it can be employed in the first stage with higher hydrogen ethylene ratios than actually used heretofore; higher tolerance for hydrogen, allows control of HLMI in the first stage product of the process. For example, this catalyst allows for hydrogen to ethylene ratios of about 0.067 to give a 0.41 HLMI ($MI_{21}$) resin. The blends resulting from the catalysis improves the MD tear (g/mil) while maintaining TD tear properties.

An independent catalyst system can be used to make the low molecular weight component. One suitable class of catalysts for this purpose, comprises:

(i) a catalyst precursor complex or mixture of complexes consisting essentially of magnesium, titanium, a halogen, and an electron donor; and (ii) at least one hydrocarbyl aluminum cocatalyst.

The titanium based complex or mixture of complexes is exemplified by an empirical formula $Mg_aTi(OR)_bX_c(ED)_d$ wherein R is an aliphatic or aromatic hydrocarbon radical having 1 to 14 carbon atoms or COR' wherein R' is an aliphatic or aromatic hydrocarbon radical having 1 to 14 carbon atoms; each OR group is alike or different; X is Cl, Br, or I, or mixtures thereof; ED is an electron donor, which is a liquid Lewis base in which the precursors of the titanium based complex are soluble; a is 0.5 to 56; b is 0,1, or 2; c is 1 to 116, particularly 2 to 116; and d is 2 to 85.

The titanium compound, which can be used in the above preparations, has the formula $Ti(OR)_aX_b$ wherein R and X are as defined for component (i) above; a is 0, 1 or 2; b is 1 to 4; and a+b is 3 or 4. Suitable compounds are $TiCl_3$, $TiCl_4$, $Ti(OC_6H_5)Cl_3$, $Ti(OCOCH_3)Cl_3$ and $Ti(OCOC_6H_5)Cl_3$.

The magnesium compound has the formula $MgX_2$ wherein X is as defined for component (i) above. Suitable examples are $MgCl_2$, $MgBr_2$, and $MgI_2$. Anhydrous $MgCl_2$ is a preferred compound. About 0.5 to 56, and preferably about 1 to 10, moles of the magnesium compound are used per mole of titanium compound.

The electron donor used in the catalyst composition is an organic compound, liquid at temperatures in the range of about 0° C. to about 200° C. It is also known as a Lewis base. The titanium and magnesium compounds are both soluble in the electron donor.

Electron donors can be selected from the group consisting of alkyl esters of aliphatic and aromatic carboxylic acids, aliphatic ketones, aliphatic amines, aliphatic alcohols, alkyl and cycloalkyl ethers, and mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

The cocatalyst may, for example, have the formula $AlR''_eX'_fH_g$ wherein X' is Cl or OR'''; R'' and R''' are saturated aliphatic hydrocarbon radicals having 1 to 14 carbon atoms and are alike or different; f is 0 to 1.5; g is 0 or 1; and e +f+g=3. Examples of suitable R, R', R'', and R''' radicals are: methyl, ethyl, propyl, isopropyl, butyl, isobutyl, tert-butyl, pentyl, neopentyl, hexyl, 2-methylpentyl, heptyl, octyl, isooctyl, 2-ethyhexyl, 5,5-dimethylhexyl, nonyl, isodecyl, undecyl, dodecyl, cyclohexyl, cycloheptyl, and cyclooctyl. Examples of suitable R and R' radicals are phenyl, phenethyl, methyloxyphenyl, benzyl, tolyl, xylyl, naphthal, and methylnaphthyl. Some examples of useful cocatalyst are triisobutylaluminum, trihexyaluminum, di-isobutylaluminum, hydride, dihexylaluminum hydride, di-isobutylhexylaluminum, trimethylaluminum, triethylaluminum, diethylaluminum chloride, $Al_2(C_2H_5)_3Cl_3$, and $Al(C_2H_5)_2(OC_2H_5)$.

While it is not necessary to support the complex or catalyst precursors mentioned above, supported catalyst precursors do provide superior performance and are preferred. Silica is the preferred support. Other suitable inorganic oxide supports are aluminum phosphate, alumina, silica/alumina mixtures, silica pretreated with an organoaluminum compound such as triethyaluminum, and silica modified with diethylzinc, such modifier being used in a quantity sufficient to react with the hydroxyl groups on the support which otherwise tend to react with and deactivate part of the titanium in the catalyst, but not in sufficient quantity to function as a cocatalyst. A typical support is a solid, particulate material essentially inert to the polymerization. It is used as a dry powder having an average particle size of about 10 to 250 microns and preferably about 30 to about 100 microns; a surface area of at least about 3 square meters per gram and preferably at least about 50 square meters per gram; and a pore size of at least about 80 Angstroms and preferably at least about 100 Angstroms. Generally, the amount of support used is that which will provide about 0.01 to about 0.5, and preferably about 0.2 to about 0.35 millimole of transition metal per gram of support. Impregnation of the above-mentioned catalyst precursor into, for example, silica is accomplished by mixing the complex and silica gel in the electron donor solvent followed by solvent removal under reduced pressure and/or elevated temperature.

Broad, exemplary ranges and preferred ranges of molar ratios of various components of the foregoing catalyst systems utilizing titanium/magnesium complexes are as follows:

TABLE I

| Catalyst Components | Broad Exemplary Range | Preferred Range |
|---|---|---|
| 1. Mg:Ti | 0.5:1 to 56:1 | 1.5:1 to 5:1 |
| 2. Mg:X | 0.005:1 to 28:1 | 0.075:1 to 1:1 |
| 3. Ti:X | 0.01:1 to 0.5:1 | 0.05:1 to 0.2:1 |

TABLE I-continued

| Catalyst Components | Broad Exemplary Range | Preferred Range |
| --- | --- | --- |
| 4. Mg:ED | 0.005:1 to 28:1 | 0.15:1 to 1.25:1 |
| 5. Ti:ED | 0.01:1 to 0.5:1 | 0.1:1 to 0.25:1 |
| 6. Cocatalyst used as Partial Activator:Ti | 0:1 to 50:1 | 0:1 to 5:1 |
| 7. Total Cocatalyst:Ti | 0.6:1 to 250:1 | 11:1 to 105:1 |
| 8. ED:Al | 0.05:1 to 25:1 | 0.2:1 to 5:1 |

Specific examples of the described catalysts comprising a titanium/magnesium complex, and methods for their preparation are disclosed, for example, in U.S. Pat. Nos. 3.989,881; 4,124,532, 4,174,429; 4,349,648; 4,379,759; 4,719,193; and 4,888,318; and European Patent application Publication Nos. 0 012 148; 0 091 135; 0 120 503; and 0 369 436; and the entire disclosures of these patents and publications pertaining to catalysts are incorporated herein by reference.

Referring now to the drawing, catalyst component containing transition metal, e.g. titanium, is fed into first reactor 1 through line 2. Ethylene, comonomer, e.g., n-hexene, if used, hydrogen, if used, inert gas such as nitrogen, if used, and cocatalyst, e.g. triethylaluminum (TEAL), are fed through line 3 into recycle line 4 where they are combined with recycle gas and fed into the bottom of reactor 1. The gas velocity is high enough and the size and density of the particles in reactor 1 are such as to form a fluidized or dense bed 5 comprising catalyst particles associated with polymer formed by the polymerization of ethylene and, if present, comonomer within reactor 1. The conditions in reactor 1, e.g. partial pressure of ethylene, hydrogen/ethylene molar ratio, temperature, total pressure, etc. are controlled such that the polymer which forms is of relatively high molecular weight (HMW). Recycle gas leaving the top of reactor 1 through line 4 is recompressed in compressor 6, cooled in heat exchanger 7 after passing through valve 8 and are fed to the bottom of reactor 1 after being optionally combined with make-up gases and cocatalyst from line 3 as described.

Periodically, when sufficient HMW polymer has formed in reactor 1, the polymer and catalyst 1 are transferred to discharge tank 9 by opening valve 10 while valves 11, 12 and 13 remain closed. When an amount of the HMW polymer and catalyst from reactor 1 which is desired to be transferred has been fed to discharge tank 9, the transfer system to second reactor 14 is activated by opening valve 13 to force the HMW polymer and catalyst into transfer hose 15. Valve 13 is then closed to isolate transfer hose 15 from discharge tank 9 and valve 11 is opened, ensuring that any gases leaking through valve 13 are vented and do not back-leak across valve 10 into reactor 1. Transfer hose 15 is then pressurized with reactor-cycle gas from reactor 14 by opening valve 16. To minimize upsets in reactor 14, surge vessel 17 is used to store gas for pressuring transfer hose 15. With valve 16 still in the open position, valve 18 is opened to convey HMW polymer and catalyst into reactor 14. Both valves 16 and 18 are left open for a period to sweep transfer hose 15. Valves 18 and 16 are then closed sequentially. Transfer hose 15 is then vented by opening valve 13, valve 11 having remained open during the transfer operation. Discharge tank 9 is then purged with purified nitrogen through line 18A by opening valve 12.

During the transfer, cycle gas comprising hydrocarbons and hydrogen leaves reactor 14 through line 19, is compressed by compressor 20, flows through valves 21, 22 and 23 in line 24 and through surge tank 17, valve 16 and pressurized transfer hose 15 as described, thus effecting the transfer of HMW polymer and catalyst to reactor 14.

After the transfer to reactor 14 is effected, the flow of gas from reactor 14 to transfer hose 15 is stopped by closing valves 21, 22, 23 and 16. Ethylene, hydrogen, comonomer, e.g., n-hexene, if used, inert gas such as nitrogen, if used, and cocatalyst or catalyst component, if used, e.g., TEAL, are fed to reactor 14 through line 25 after being combined with unreacted cycle gas leaving the top of reactor 14 through line 19 which is compressed in compressor 20, cooled in heat exchanger 26 and enters the bottom of reactor 14 through line 27. The gas velocity and size and density of the particles in reactor 14 are such as to form fluidized or dense bed 28 of bimodal polymer particles associated with the catalyst, including the transition metal primary catalyst component added to reactor 1. The conditions in reactor 14, e.g., partial pressure of ethylene, hydrogen/ethylene ratio and temperature, are controlled such that a relatively low molecular weight (LMW) polymer forms primarily within the voids of the HMW polymer/catalyst particles transferred from reactor 1. After a sufficient amount of LMW polymer has formed resulting in a bimodal polymer having a desirable molecular weight distribution and other properties, the polymer is transferred to discharge tank 29 by opening valve 30 while keeping valve 31 closed. After substantially all the polymer has been transferred to discharge tank 29, it is collected by closing valve 30 and opening valve 31, resulting in the pressure discharge of the final polymer product through line 32.

The significance of bubble stability of melts of blends of the invention can be gleaned from the following discussion of the high stalk extrusion manipulations which involve extruding at rates of at least 150 feet per minute preferably at greater than 250 feet per minute (line speed.)

Polyethylene resins prepared in the process of this invention are primarily used for the manufacture of biaxially oriented blown film in a high-stalk extrusion process. In this process, a polyethylene melt is fed through a gap (typically 30–50 mm) in an annular die attached to an extruder and forms a tube of molten polymer which is moved vertically upward. The initial diameter of the molten tube is approximately the same as that of the annular die. Pressurized air is fed to the interior of the tube to maintain a constant air volume inside the bubble. This air pressure results in a rapid 3-to-9-fold increase of the tube diameter which occurs at a height of approximately 5 to 10 times the die diameter above the exit point of the tube from the die. The increase in the tube diameter is accompanied by a reduction of its wall thickness to a final value ranging from approximately 0.5 to 2 mils and by a development of biaxial orientation in the film. The expanded tube is rapidly cooled (which induces crystallization of the polymer), collapsed between a pair of nip rolls and wound onto a film roll.

Two factors determine suitability of a particular polyethylene resin for high stalk extrusion: the maximum attainable rate of film manufacture and mechanical properties of the formed film. Different HDPE resins greatly vary in their processing stability at high rates of film manufacture. Adequate processing stability is desired at throughput rates of up to 15 lb/hr/inch die and high linespeeds (>200 ft/min) for thin guage manufacture on modern extrusion equipment. The resins produced in the polymerization process of this invention with the catalyst systems of this invention have molecular characteristics which allow them to be processed successfully at these high speeds. Mechanical strength of the film is different in two film directions, along the film roll (machine direction, MD) and in the perpendicular direction (transverse direction, TD). Typically, the TD strength in such films is significantly higher than their MD strength. The films manufactured from the resins prepared in the process of this invention with the catalyst of this invention have a favorable balance of the MD and TD strengths.

In accordance with the invention, a melt of the linear polyethylene is fed through a gap in an annular die for extrusion in the form of a tube, which is moved vertically upward. The bubble formed is measured in feet to the frost line. Pressurized air is fed to the interior of the bubble formed by the tube, which blows it to a greatly increased diameter and correspondingly reduced wall thickness and results in biaxial orientation of the film. Cooling air is supplied to the exterior surface of a bubble, while the extruded tube of molten material is being drawn. Further handling usually involves collapsing the tube between a pair of rolls to a flattened double-wall web at a stage in the cooling at which the wall surfaces will not adhere to one another. The flattened tube is wound onto a roll and/or further processed.

Cooling air can be supplied to the exterior surface of a bubble by one or more cooling rings, each of which discharges one or more annular streams of cooling air for heat exchange engagement with the bubble exterior surface. One often used arrangement is to employ a primary ring in the immediate neighborhood of the die orifice, and a more powerful secondary ring spaced along the path of the bubble at a location at which the melt, while still not solidified, has cooled sufficiently to withstand the force of the more powerful secondary ring air stream or streams.

These air rings can be configured, prearranged, not only to cool, but also to shape, the tube of molten resin. Controlling the configuration of the tube and bubble, by such air rings is described in U.S. Pat. No. 4,118,453 which is incorporated by reference herein. The internal pressure of the tube is maintained by employing pressurized gas (air) during passage of the tube through the air rings. The apparatus in which such means are used are sometimes referred to as "stalk extruders"; stalk extruders are commercially available from Alpine.

Thus in accordance with the invention the process comprises extruding the polyethylene through an annular die to form an extruded tube of molten material, cooling the extruded tube while drawing the tube so cooled, expanding the tube to attenuate the walls thereof by introducing a gas to the interior of the tube, and flowing a cooling gas in contact with the outer surface of said tube from a plurality of annular zones about said extruded tube spaced along the axis therof and being of increasing diameter in the direction away from the point of extrusion; the plurality of annular zones can be provided by circular pairs of annular zones about said extruded tube. In U.S. Pat. No. 4,118,453, incorporated by reference herein, as noted above, additional separate pairs of cooling gas confined streams are directed against said film on each side of a shape restricting surface which extends beyond the discharge boundaries of the discharged confined streams; the said additional cooling gas streams are passed in contact with the outer surface of said film tube at each of said shape restricting surfaces to produce a positive gas pressure zone between said surface and said film material and then said cooling gas is withdrawn from such contact between each pair of adjacent cooling gas inlets.

In accordance with the invention the molten polyethylene, described above, is formed into a tube or a bubble having at least two different diameters, the smaller of the two diameters being substantially that of the die and the second diameter of the bubble exceeding that diameter of the die, with a frost height line downstream of the portion of the bubble having said smaller diameter and downstream of the portion of the bubble having said second diameter. The Frost line is the line where the extruded tube or bubble changes from molten to solid character.

While the diameter of the tube is that of the die, the stresses, as well as machine direction (MD) orientation, in the melt relax; this stage of the process has been found to be critical to increase in MD tear resistance and impact resistance. As the tube diameter increases, the pressure increases within the bubble; that is the pressure differential between the inside of the tube and the external surface of the tube increases as the diameter increases. The increase in diameter can be 3:1 to 5:1 and up to 7:1 to 9:1 times the die diameter. This expansion in bubble diameter occurs before the melt turns into a solid. As suggested above, the frost line height is where the film is below its melting point with no more expansion in the transverse direction and so no increase in bubble diameter. The resulting films have thicknesses of 1 mil gauge or less preferably of 0.5 mil and most preferably 0.5 mil or less.

EXAMPLES

Catalyst Preparation

Example 1—Preparation of Catalyst Containing MgO treated with acetic acid:

A sample of MgO support (Merck-Maglite D) was dried in a 500-ml 3-neck flask under nitrogen at 250° C. for 16 hours without stirring. 30.8 grams of this dry MgO support was then slurried in 200 ml of dry hexane in a 500-ml 3-neck flask and refluxed for 16 hours with 0.44 ml glacial acetic acid (99.8% pure acetic acid) at 0.01 molar ratio of the acid to the MgO. A dilute pentanol solution was prepared by adding 53.5 ml of pre-dried 1-pentanol (0.494 mole) to 45 ml of dry hexane in another flask. To avoid a rapid isotherm, 54.4 ml of neat TiCl$_4$ (0.494 mole) was added dropwise to the 1-pentanol solution to form the titanium compound solution. The (1:1 pentanol/TiCl$_4$) solution was immediately added to the acetic acid-treated MgO at room temperature. The slurry was refluxed at 70° C. for 16 hours and allowed to cool.

The catalyst precursor was washed 6 times with 100 ml of dry hexane. The solid was re-slurried with 200 ml of dry hexane, and 12 ml of 25 wt. % tri-n-hexylaluminum (TNHAL) solution (7.66 mmole TNHAL) was slowly added (about 3 minutes) to form a catalyst having an Al/Ti ratio of 0.23. The catalyst was dried for 16 hours at 65° C. under nitrogen purge, to give a free-flowing light brown powder. Elemental analysis indicated that the finished catalyst contained 1.1 mmoles/g of Ti.

Example 2—Preparation of Catalyst Containing MgO treated with octanoic acid:

The preparation procedures are similar to Example 1 except octanoic acid was used in place of acetic acid to modify the MgO support.

Example 3—Slurry Polymerization with Example 1 for Low Molecular Weight Product:

The polymerization was conducted in a 1-gallon slurry reactor at 90° C. with 2 liters of polymerization grade hexane. 0.138 g of Example 1 catalyst (0.127 mmole Ti) and 1.8 ml of di-isobutylaluminumhydride (DIBAH) solution (25 wt. % in heptane: 2.27 mmole Al), no hexene comonomer, and hydrogen were added to the reactor. The polymerization was run at ethylene partial pressure of 70 psia to produce the HDPE products. The $H_2:C_2$ molar ratio was maintained at 3:1. The product was stabilized with 500 ppm of Irganox 1076, and then it was dried in vacuum oven for 4 hours at 65° C. The product was 1043 $I_2$ homopolymer, and the productivity of the catalyst was 1875 g/g cat./hr.

Example 4—Slurry Polymerization with Example 1 Catalyst for High Molecular Weight Product:

The polymerization was conducted in a 2-gallon slurry reactor at 90° C. with 4 liters of polymerization grade hexane. 0.073 g of Example 1 catalyst, 3.6 ml DIBAH solution, and 40 ml of 1-hexene were added to the reactor. The polymerization was run at 155 psia partial pressure of ethylene and the $H_2:C_2$ molar ratio was maintained at 0.06 to produce the high molecular weight product. The productivity of the catalyst was 5877 g/g cat./hr. and the product was 0.35 $I_{21}$ copolymer.

Examples 3 and 4 indicate that it is possible to generate high and low molecular weight polymers in a tandem process to produce bimodal molecular weight distribution products using this catalyst.

Example 5—Slurry Polymerization with Example 2 Catalyst for High Molecular Weight Product:

The polymerization was conducted in a 2-gallon slurry reactor at 90° C. with 4 liters of polymerization grade hexane. 0.047 g of Example 2 catalyst, 2.5 ml TEA solution (25 wt. %), and 10 ml of 1-hexene were added to the reactor. The polymerization was run at 110 psia partial pressure of ethylene and the $H_2:C_2$ molar ratio was maintained at 0.05 to produce high molecular weight (HMW).

The productivity of the catalyst was 4500 g/g cat./hr. and the product was 3.42 $I_{21}$, 0.28 $I_5$, and 12.2 FR ($I_{21}/I_5$) copolymer with a molecular weight distribution suitable for generating HMW component for HD HMW Film tandem resins.

Example 6—Slurry Polymerization with Example 2 Catalyst for High Molecular Weight Component to Simulate the Conditions of the First Reactor for a Tandem Process:

The polymerization was conducted in a 500 ml slurry reactor at 90° C. with 250 ml of polymerization-grade hexane. Approximately 5 ml of 1-hexene, 1 ml of triethylaluminum solution (25 wt. % in heptane) as cocatalyst 1.5 mmole Al), 2.5 psia hydrogen and 0.0165 g of Example 2 catalyst were added in sequence to the reactor. The polymerization was run at 48.5 psia partial pressure of ethylene for one hour to give 32.3 g of polyethylene. The productivity was 1958 g/g cat./hr, and the product was 3.1 $I_{21}$ copolymer.

Example 7—Slurry Polymerization with Example 2 Catalyst for Low Molecular Weight Component to Simulate the Conditions of the Second Reactor for a Tandem Process:

The polymerization was conducted in a 500 ml slurry reactor at 90° C. with 250 ml of polymerization-grade hexane. Approximately 5 ml of 1-hexene, 1 ml of triethylaluminum (25 wt. % in heptane) as cocatalyst (1.5 mmole Al), 114 psia hydrogen and 0.0252 g of Example 2 catalyst were added in sequence to the reactor. The polymerization was run at 46 psia ethylene partial pressure for one hour to give 47 g of polyethylene. The productivity of the catalyst was 1865 g/g cat./hr. and the polymer was 288 $I_2$ homopolymer.

Example 6 and Example 7 showed that the productivity of Example 2 catalyst is suitable for tandem reactor operations. It suffers less than an ordinary catalyst under high hydrogen partial pressure.

Comparative Example 1—Preparation of the Comparative Catalyst 491 kg of Davison 955 silica was dehydrated at 600° C. for 4 hours. This dry silica was transferred to a mix vessel, and 7.173 liters/kg dry silica of isopentane and 0.882 liters/kg dry silica of 11 wt. % triethylaluminum (TEA) in isopentane solution were also charged to the mix vessel. The slurry was agitated at 60° C. for 1 hour. Under dry nitrogen purge, the temperature was raised to 80° C. to evaporate the solvent to give "TOS" (TEA on silica).

The temperature of the precursor solution vessel was set at 45° C. Approximately 300 gallons of fresh THF and 45.4 kg of the pre-purged (5 times with dry nitrogen) $MgCl_2$ were charged to the vessel. The temperature was then raised to 70° C., 31 kg $TiCl_3$ was added, and the precursor solution was stirred for 4 hours.

The mix vessel was maintained at 70° C. and the precursor solution was charged to the TOS while agitating. The agitation was continued for one hour at 70° C. and the temperature was raised to 80° C. to start the solvent evaporation. Dry nitrogen was purged through the bottom of the catalyst mix vessel for about 20 hours to give free-flow SIMP catalyst.

Slurry Polymerization with Comparative Example 1 Catalyst for High Molecular Weight Component to Simulate the Conditions of the First Reactor for a Tandem Process The polymerization was carried out as described in Example 6 except 0.023 g of the Comparative-Example 1 catalyst was used in place of Example 2 catalyst. The productivity was 978 g/g cat./hr and the product was 7.7 $I_{21}$ copolymer.

Comparative Example 3—Slurry Polymerization with Comparative Example 1 Catalyst for Low Molecular Weight Component to Simulate the Conditions of the Second Reactor for a Tandem Process.

The polymerization was carried out as described in Example 7 except 0.0235 g of the Comparative Example 1 catalyst was used in place of Example 2 catalyst. The productivity was 425 g/g cat./hr and the product was 241 $I_2$ homopolymer.

Comparing Example 6 with Comparative Example 2 and Example 7 with Comparative Example 3, as shown in Table 1, it is obvious that the activity of Example 2 catalyst is higher and it suffers less under high hydrogen partial pressure conditions than the Comparative Example catalyst 1.

TABLE 1

| Catalyst | Ex. 6 | Comp. Ex. 2 | Ex. 7 | Comp. Ex. 3 |
|---|---|---|---|---|
| H2/C2 | 0.05 | 0.05 | 2.5 | 2.5 |
| Productivity (g/g cat./hr) | 1960 | 980 | 1860 | 425 |
| $MI_2$ | 0.07 | 0.19 | 288 | 241 |
| $MI_{21}$ | 3.1 | 7.7 | — | — |

Example 7' and Comparative Example 4

Addition of hydrogen during ethylene polymerization reactions with Ti-based catalysts always results in suppression of catalyst activity. However, the decrease in activity is catalyst-dependent. Two polymerization experiments were conducted at 90° C. in a 500 ml slurry reactor filled with 250 ml of heptane containing 1.5 mmol of triethylaluminum as cocatalyst. Catalyst of Example 2 (0.0285 g) was used in one experiment (Example 7') and catalyst of Comparative Example 1 ((0.0257 g) was used in another experiment (Comparative example 4). The ethylene partial pressure in each experiment was maintained at 90 psi. During each experiment, the hydrogen partial pressure was increased from 0 to 90 psi and the resulting decrease in the polymerization rate was measured. The results are presented in Table 2.

TABLE 2

| | Catalyst | Activity depression at $P_H/P_E = 1$ |
|---|---|---|
| Example 7' | Example 2 | 52% |
| Comp. Example 7 | Comp. Example 1 | 74% |

These comparisons show that the catalyst formulations of this invention are adversely affected by hydrogen to a lesser degree than the catalyst formulation of Comparative Example 1.

Example 8—Gas-Phase Fluid-Bed Polymerization with Example 2 Catalyst under the Conditions of the First Reactor for a Tandem Process:

In a four cubic foot gas-phase fluid-bed reactor, at 74° C., the Example 2 catalyst was run under conditions corresponding to the expected conditions in the first reactor of a HMW-first tandem process. As shown in Table II, the ethylene partial pressure was kept at 43 psia during the entire run. There was no sign of static or fouling of pressure taps. 49 psia of isopentane was used to further enhance process continuity. 0.067 hydrogen to ethylene ratio and 0.058 hexene to ethylene in the gas phase were maintained. A 0.41 $MI_{21}$, 0.9295 (g/cc), 23.5 lb/ft$^3$, and 0.019 inch of average particle size resin was produced. This resin was later used in blend studies.

Example 9—Blend study to simulate tandem-process HD-HMW film-grade resin using high molecular weight polymer component (Example 8) prepared with the catalyst of this invention.

Several resin blends were prepared with compositions imitating tandem resins. In two cases, the high molecular weight component was prepared with the catalyst of Example 2. The density of the resin was 0.931 and its $I_{21}$ value was 0.47. In other two cases the high molecular weight component was prepared with the catalyst of Comparative Example 1. The density of the resin was 0.926 and $I_{21}$ was 0.38. In all these examples, the low molecular weight component was the same. It was prepared with the catalyst of Comparative Example 1. It has $I_2=250$ and density 0.960. It is known that the low molecular weight component in such blends does not have significant effect on mechanical properties of the blends and is merely used to enhance processability of the blends. The components were melt-blended in a Banbury batch mixer under mild conditions to prevent tailoring of the resins. Properties of the blends are given in Table II.

TABLE II

| Blend No. | Catalyst for HMW component | Properties of HMW Component | Content of HMW Component | Properties of Blend |
|---|---|---|---|---|
| 1 | Example 2 | $I_{21} = 0.47$<br>d = 0.931<br>FR = 18.0 | 52% | $I_{21} = 10.5$<br>MFR = 148 |
| 2 | Example 2 | $I_{21} = 0.47$<br>d = 0.931<br>FR = 18.0 | 58% | $I_{21} = 6.1$<br>MFR = 153 |
| 3 | Comparative Example 1 | $I_{21} = 0.38$<br>d = 0.926<br>FR = 11.4 | 52% | $I_{21} = 9.9$<br>MFR = 115 |
| 4 | Comparative Example 1 | $I_{21} = 0.38$<br>d = 0.926<br>FR = 11.4 | 58% | $I_{21} = 5.7$<br>MFR = 94 |

As shown in Table II, the blends made with the HMW component produced with the catalyst of Example 2 had broader molecular weight distributions (higher MFR values) compared to those for the blends made with the HMW component produced with the catalyst of Comparative Example 1.

Films were manufactured from the blends listed in Table II using the Alpine Film Line. The blends based on the HMW component produced with the catalyst of Comparative Example 1 exhibit very poor bubble stability (<100 foot/min). These blends could not be processed into 0.5-mil film. On the other hand, the blends made with the HMW component produced with the catalyst of Example 2 exhibit excellent bubble stability, with a stable bubble at line speeds exceeding 300 foot/min. The 0.5-mil film was easily manufactured with these blends. Ability to manufacture films from untailored resins has a significant cost advantage.

MD tear value is one of the crucial parameters that characterize HMW HDPE films. All 1-mil films which contain the HMW component produced with the catalyst of Example 2 have the MD tear values of approximately 29 g, which is, on average, 15% higher than the MD tear values of the 1-mil films which contain the HMW component produced with the catalyst of Comparative Example 1.

Examples 8' and 9'

Preparation of polymers under conditions corresponding to tandem process.

To demonstrate the use of the catalyst formulation of this invention for a two-stage synthesis of HDPE resins with broad molecular weight distributions, two experiments were carried out in which reaction conditions (hydrogen/ethylene ratios and temperature) were changed in the course of polymerization reactions. The reactions were carried out in a 50 ml reactor containing 250 ml heptane and small amounts of 1-hexene. Catalyst of Example 2 was used in both reactions (0.0255 g in Example 8' and 0.0321 g in Example 9'). Both polymerization reactions were carried out in two stages. In the first stages, the reactions were carried out at low $P_H/P_E$ ratios and, in the second stages, at high $P_H/P_E$ ratios. Polymer yields were 30.8 g in Example 8' and 24.1 g in Example 9'. Table 3 gives conditions of these experiments and properties of the resins.

TABLE 3

A. Reaction conditions

| Example | Catalyst | Cocat. | Hexene | Temperature 1 stage | Temperature 2 stage | $P_H/P_E$ 1 stage | $P_H/P_E$ 2 stage |
|---|---|---|---|---|---|---|---|
| 8' | Ex. 2 | TEAL | 4 wt. % | 80° C. | 95° C. | 0.04 | 2.5 |
| 9' | Ex. 2 | TEAL | 2 wt. % | 80° C. | 95° C. | 0.006 | 2.5 |

B. Resin Properties

| Example | Fraction of resin made in first stage | $I_2$ | $I_{21}$ | MFR = $I_{21}/I_2$ |
|---|---|---|---|---|
| 8' | 49% | 0.064 | 6.5 | 102 |
| 9' | 52% | 0.164 | 26.0 | 159 |

These examples show that the catalysts of this invention afford synthesis of HDPE resins with broad molecular weight distributions (as characterized by high MFR values) required for high-strength film applications.

Thus it is apparent that there has been provided, in accordance with the invention, a product and process for its production, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for in situ blending of a resin for blown film production, comprising
   providing a low melt index component in the form of particles comprising MgO and a polymeric component, said particles having an average particle size of about 127 to about 1270 microns; said polymeric component having a flow index (FI or $I_{21}$, measured at 190° C. in accordance with ASTM D-1238, Condition F) of about 0.05 to 5, and a density in the range of about 0.890 to 0.960, and formed in a first gas phase comprising contacting a gaseous feed, with a catalyst composition, under ethylene polymerization conditions including a temperature of polymerization in the first gas phase of about 60° to 130° C.,
   wherein the gaseous feed is selected from the group consisting of ethylene, hydrogen, at least one alpha-olefin of 4 to 10 carbon atoms, and admixtures thereof;
   wherein the catalyst comprises an MgO support and titanium wherein the titanium comprises 0.5 to 2.0 millimoles per gram of catalyst, wherein the MgO support is treated, prior to admixture with said titanium, with an organic acid selected from the group consisting of acetic acid and octanoic acid in an amount such that the molar ratio of organic acid to MgO is from 0.001 to 0.5;
   wherein a source of said titanium is a reaction product of an alkanol of 5 to 12 carbon atoms in a mole ratio of about 0.5 to 1.5 of the alkanol per mole of tetravalent titanium;
   wherein an admixture of said MgO and source of titanium is treated with 0.25 to 1 millimole/gram catalyst of a reagent selected from the group consisting of triethylaluminum, tri-n-hexylaluminum, diisobutylaluminum hydride, and trimethylaluminum to form a precursor;
   wherein said precursor is contacted with a cocatalyst wherein the cocatalyst is present in an amount which ranges from 0.5 to 2.0 millimoles per gram of catalyst, wherein, in the first gas phase, the hydrogen/ethylene molar ratio ($H_2/C_2$ ratio) is up to about 0.3 and the ethylene partial pressure is up to about 100 psia, and
   blending the particles with a high load melt index polymer of ethylene containing at least 80 weight percent of ethylene units, wherein the high load melt index polymer is formed at a temperature in the range of about 80° to 130° C., wherein the temperature of formation of the high load melt index polymer is higher than that in the first gas phase; and
   producing a high density bimodal blend.

2. The process of claim 1, wherein temperature of formation of the high load melt index polymer is 90° to 120° C.

3. The process of claim 1, wherein temperature of formation is at least about 10° C. higher than temperature in the first gas phase.

4. The process of claim 1, wherein said blending is undertaken in a fluidized bed in a second gas phase at a temperature in the range of about 80° to 130° C., and feeding into said second gas phase, hydrogen and a gaseous monomeric composition comprising a major proportion of ethylene, wherein the hydrogen/ethylene provide a $H_2/C_2$ molar ratio of at least about 0.9 which is at least about 8.0 times greater than a $H_2/C_2$ molar ratio in said first reaction zone, and an ethylene partial pressure of at least 1.7 times that in said first reaction zone, to increase the average bulk density of the polymer/catalyst particles; and recovering a final granular bimodal polymer from the second reactor which has a weight fraction of said HMW polymer of about 0.35 to 0.75, a flow index in the range, for example, of about 3 to 200, and a density of about 0.938 to 0.97 g/cc.

5. The process of claim 4, wherein said final granular product has an average particle size which is substantially the particle size of said low melt index component.

6. The process of claim 1, wherein said blending is undertaken in a second gas phase in the presence of a second catalyst composition comprising a complex of titanium, magnesium and tetrahydrofuran supported on silica.

7. The process of claim 2, wherein said organic acid is octanoic acid.

8. The process of claim 7, wherein said alpha-olefin is 1-butene, 1-hexene or 1-octene.

9. The process of claim 8, wherein the alpha-olefin is 1-hexene.

10. The process of claim 5, wherein said organic acid is octanoic acid.

11. The process of claim 10, wherein said alpha-olefin is 1-butene, 1-hexene or 1-octene.

12. The process of claim 11, wherein the alpha-olefin is 1-hexene.

13. A process for blown film production by in situ blending of a resin for blown film production, comprising providing a low melt index component in the form of particles comprising MgO and a polymeric component, said particles having an average particle size of about 127 to about 1270 microns; said polymeric component having a flow index (FI or $I_{21}$, measured at 190° C. in accordance with ASTM D-1238, Condition F) of about 0.05 to 5, and a density in the range of about 0.890 to 0.960, and formed in a first gas phase comprising contacting a gaseous monomeric feed, with a catalyst composition, under ethylene polymerization conditions including a temperature of polymerization in the first gas phase of about 60° to 130° C., wherein the gaseous feed is selected from the group consisting of ethylene, hydrogen, at least one alpha-olefin of 4 to 10 carbon atoms, and admixtures thereof;

wherein the catalyst comprises an MgO support and titanium wherein the titanium comprises 0.5 to 2.0 millimoles per gram of catalyst, wherein the MgO support is treated, prior to admixture with said titanium, with an organic acid selected from the group consisting of acetic acid and octanoic acid in an amount such that the molar ratio of organic acid to MgO is from 0.001 to 0.5;

wherein a source of said titanium is a reaction product of an alkanol of 5 to 12 carbon atoms in a mole ratio of about 0.5 to 1.5 of the alkanol per mole of tetravalent titanium;

wherein an admixture of said MgO and source of titanium is treated with 0.25 to 1 millimole/gram catalyst of a reagent selected from the group consisting of triethylaluminum, tri-n-hexylaluminum, diisobutylaluminum hydride, and trimethylaluminum to form a precursor;

wherein said precursor is contacted with a cocatalyst wherein the cocatalyst is present in an amount which ranges from 0.5 to 2.0 millimoles per gram of catalyst, wherein, in the first gas phase, the hydrogen/ethylene molar ratio ($H_2/C_2$ ratio) is up to about 0.3 and the ethylene partial pressure is up to about 100 psia, and blending the particles with a high load melt index polymer of ethylene containing at least 80 weight percent of ethylene units, wherein the high load melt index polymer is formed at a temperature in the range of about 80° to 130° C., wherein the temperature of formation of the high load melt index polymer is higher than that in the first gas phase;

wherein said blending is undertaken in a fluidized bed in a second gas phase at a temperature in the range of about 80° to 130° C., and feeding into said second gas phase, hydrogen and a gaseous monomeric composition comprising a major proportion of ethylene, wherein the hydrogen/ethylene provide a $H_2/C_2$ molar ratio of at least about 0.9 which is at least about 8.0 times greater than a $H_2/C_2$ molar ratio in said first reaction zone, and an ethylene partial pressure of at least 1.7 times that in said first reaction zone, to increase the average bulk density of the particles; and recovering a final granular bimodal molecular weight polymer from the second reactor which has a weight fraction of said polymeric component of about 0.35 to 0.75, a flow index in the range of about 3 to 200, and a density of about 0.938 to 0.97 g/cc;

extruding said final granular bimodal molecular weight polymer from the second reactor through an annular die to form an extruded tube of molten material and cooling the extruded tube while drawing the tube so cooled at a rate of at least 250 ft/minute;

flowing a cooling gas in contact with the outer surface of said tube from an annular zone about said extruded tube spaced along the axis thereof and having a diameter sufficient to provide a tube diameter which is substantially the annular die diameter;

wherein said cooling gas is passed in contact with the outer surface of said tube to produce a positive gas pressure zone between said surface and said film material;

withdrawing said cooling gas from said contact; and expanding the tube to attenuate the walls thereof by introducing a gas to the interior of the tube; and recovering said film.

14. The process of claim 13, wherein said blending is undertaken in a second gas phase in the presence of a second catalyst composition comprising a complex of titanium, magnesium and tetrahydrofuran supported on silica product.

* * * * *